May 25, 1954

W. R. STAFFORD 2,679,255

SPORTSMAN'S SHELTER AND CAR SHADE

Filed Dec. 15, 1952

William R. Stafford
INVENTOR.

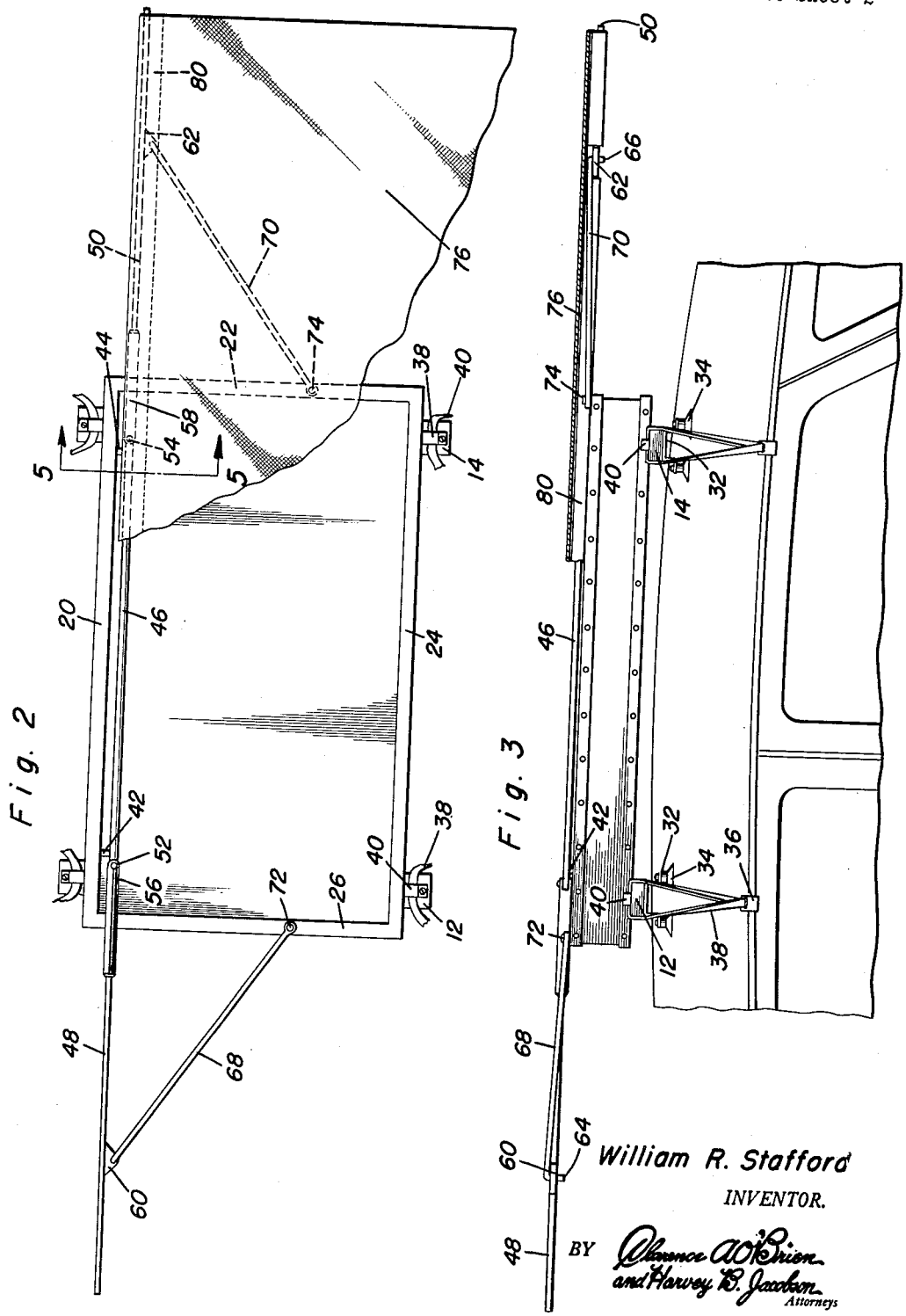

May 25, 1954
W. R. STAFFORD
2,679,255
SPORTSMAN'S SHELTER AND CAR SHADE
Filed Dec. 15, 1952
3 Sheets-Sheet 3
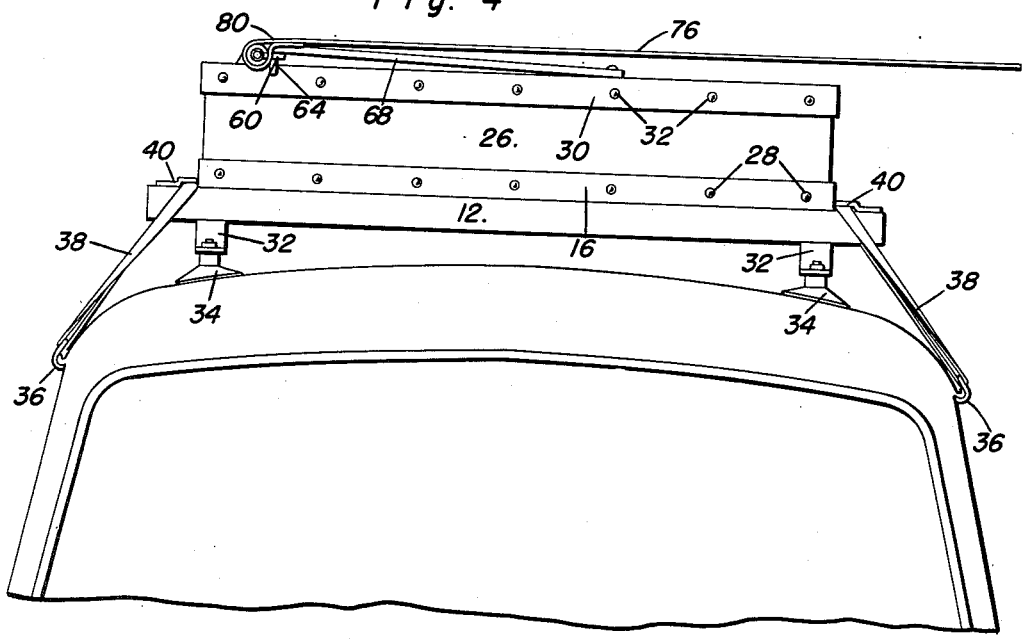
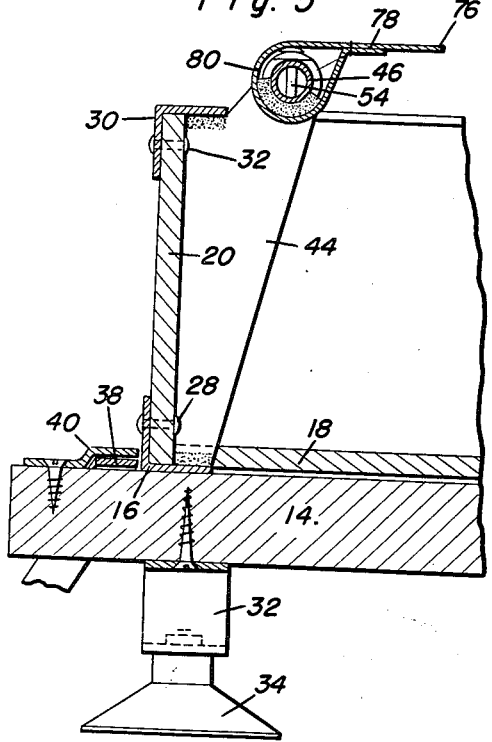
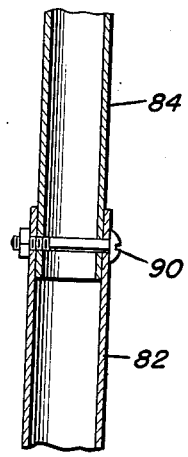
William R. Stafford
INVENTOR.

Patented May 25, 1954

2,679,255

UNITED STATES PATENT OFFICE 2,679,255

SPORTSMAN'S SHELTER AND CAR SHADE

William R. Stafford, Raymondville, Tex.

Application December 15, 1952, Serial No. 326,039

3 Claims. (Cl. 135—5)

This invention relates to an attachment for an automobile and more particularly to a sportsman's shelter and car shade.

Hunters, fishermen, and other persons who spend a good deal of time out doors are usually in need of a shelter from the sun's rays. However, it frequently occurs that shade is not available and as a result the sportsman may be subject to the discomfort of the sun's unshielded rays. It is therefore the primary object of this invention to provide an attachment for an automobile whereby a sizable awning or canopy may be rapidly erected or disassembled so as to provide adequate shade.

The construction of this invention features a casing which is adapted to be secured to the top of an automobile in which the various components of this automobile shade may be readily transported from one location to another.

Another object of this invention resides in the provision of a sportsman's shelter or car shade that is adapted to be installed on the roof of an automobile in such a manner that it may be readily removed and will not mar or injure the roof of the automobile.

Still further objects of the invention reside in the provision of a canopy of the type described that is strong, durable, highly efficient in its shading effect, simple to erect, and capable of being produced easily for sale at a relatively low cost.

These, together with the various ancillary objects of the invention which will become apparent as the following description proceeds, are attained by this sportsman's shelter and car shade, a preferred embodiment of which has been illustrated, by way of example only, wherein:

Figure 2 is a top plan view showing the invention in an extended shape with a majority of the canvas being broken away in order to show the other elements of the invention in greater detail;

Figure 3 is a vertical sectional view of the structure as illustrated in Figure 2;

Figure 4 is a front elevational view of the car shade comprising the present invention;

Figure 5 is a vertical sectional view as taken along the plane of line 5—5 in Figure 2; and, Figure 6 is an enlarged vertical sectional view showing the construction of the joints of the support sections or posts used in conjunction with the various elements of this invention.

Figure 1:
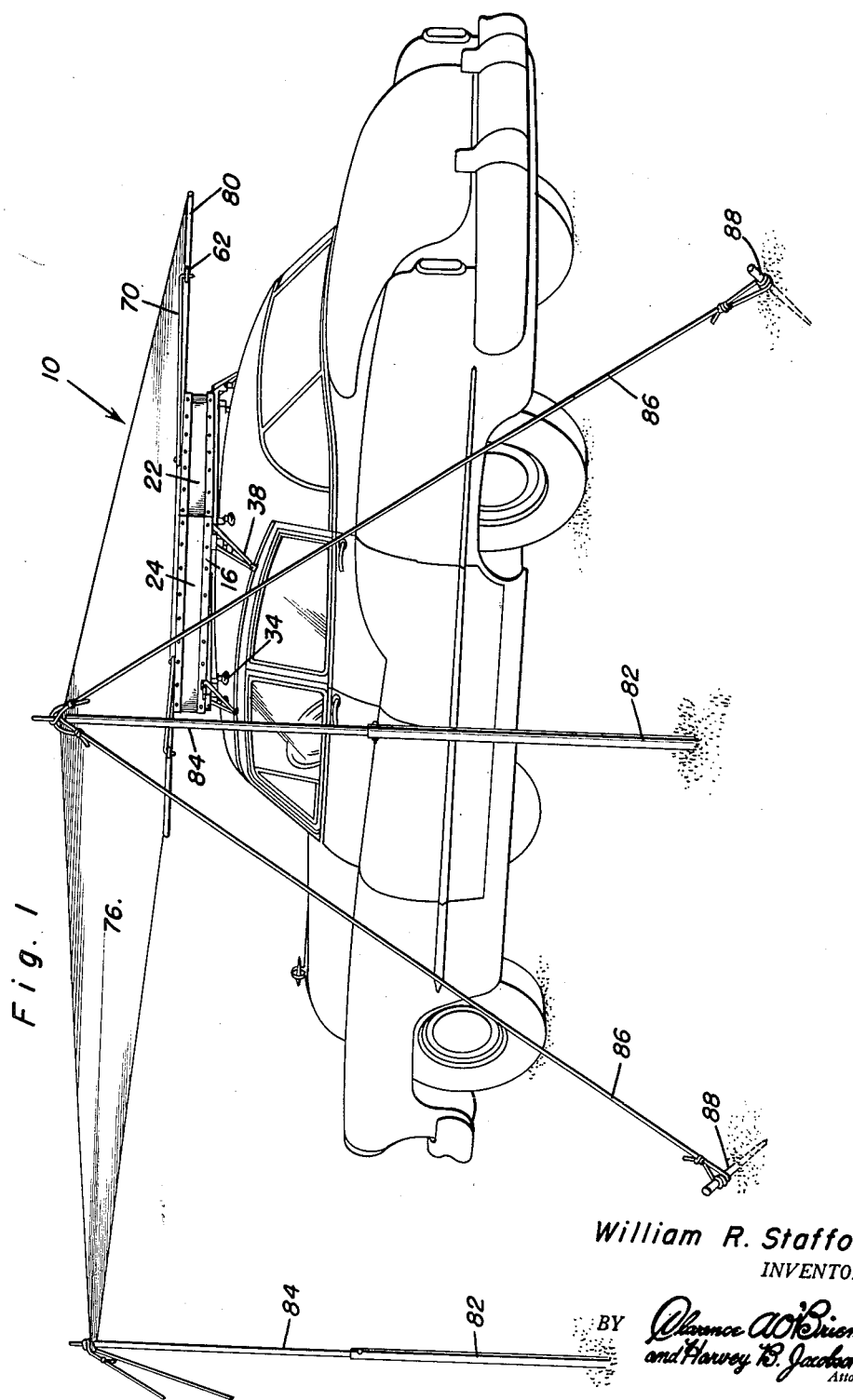
Figure 1 is a perspective view showing the car shade comprising the present invention as operatively installed on an automobile.

With continuing reference to the accompanying drawings wherein like reference numerals designate similar parts throughout the various views, reference numeral 10 generally designates the sportsman's shelter and car shade comprising the present invention. This car shade is adapted to be installed on the roof of an automobile and includes a pair of support beams 12 and 14 to which there is secured the bottom portions of a rectangular angle iron framework 16. The bottom panel 18 is supported on the angle iron framework 16 as are four side panels 20, 22, 24 and 26 riveted as at 28 or otherwise secured to the peripheral angle iron frame work 16. An angle iron framework 30 is riveted as at 32 or otherwise secured to the side panels 20, 22, 24 and 26 at the upper edges thereof.

The beams 12 and 14 are fixed to the roof of an automobile by means of suitable U-shaped brackets 32 which have pairs of suction cups 34 attached thereto. Hooks 36 adapted to engage the rain gutters above the windows along the sides of the automobile are provided and suitable straps 38 are attached to the hooks 36 and are engaged beneath retaining members 40 on the beams 12 and 14 so as to hold the beams 12 and 14 and the casing in position. The straps 38 may readily be eliminated and a turn buckle arrangement of parts may be used in lieu thereof.

Secured to the side wall 20 and extending outwardly therefrom are substantially trapezoidal shaped plates 42 and 44 which are adapted to be welded to the side wall 20. Extending between and beyond the plates 42 and 44 there is a support rod 46 spaced from and extending inwardly from the side member 20. Rod extensions 48 and 50 are provided and are pivotally hinged by pins 52 and 54 respectively, which extend through bifurcated portions 56 and 58 of the rod extensions 48 and 50. Triangular shaped plates 60 and 62 having apertures therethrough are welded to the rod extensions 48 and 50 and are adapted to receive the hooked ends 64 and 66 of diagonally extending braces 68 and 70. The other ends of the diagonal braces 68 and 70 are pivotally attached by pins 72 and 74 to the upper angle iron frame 30. A sheet of canvas 76 or any other suitable imperforate material is provided with a hem as at 78 forming a loop 80 which is engaged about the rod 46 and the rod extensions 48 and 50 with parts cut away to take care of the joints and installation of the canvas. By means of telescoping posts each of which are formed with a lower section 82 which is adapted to be inserted into the ground and an upper section 84 which is adapted to engage the free corners of the canvas, the canvas 76 is erected. Suitable guy wires as at 86 are affixed to the upper end of the upper section of the posts 84 and two stakes 88 driven into the ground. In this manner an awning adapted to provide considerable shade to a sportsman is attained.

When it is desired to move from one location to another, the guy lines 86 are unfastened and the telescoping sections 84 and 82 are removed from the ground. Then, the canvas 76 may be readily folded and the rod extensions 48 and 50 pivoted inwardly within the confines of the sides within the casing. The transverse braces 68 and 70 are also rotated inwardly after being freed from engagement with the triangular plates 60 and 62. The telescoping sections 82 and 84 are wrought together by suitable bolts 90 which extend through aligned apertures in these telescoping sections 82 and 84.

Since from the foregoing, the construction and advantages of this sportsman's shelter and car shade are readily apparent, further description is believed to be unnecessary.

However, since suitable modifications such as the addition of side curtains to the awning to form a tent may be readily resorted to by those skilled in the art, it is not intended to limit the invention to the precise embodiment shown and described, but all suitable modifications and equivalents may be readily resorted to that fall within the scope of the appended claims.

What is claimed as new is as follows:

1. An automobile top shade comprising a casing having peripheral sides and a bottom, means secured to said casing for securing said casing to the top of an automobile, a support rod secured to one of said sides, rod extensions pivotally attached to said support rod, the longitudinal axis of said extensions extending in the same direction as the axis of said rod, diagonal brace members pivotally attached to other of said sides and detachably secured to said rod extensions, a canvas sheet secured to said support rod and said rod extensions, said sheet being otherwise supported outwardly of said automobile by telescoping posts detachably engaging the free corners of said canvas sheet, said telescoping posts, said rod extensions, and said canvas sheet being adapted to be retained in said casing when said shade is collapsed.

2. An automobile top shade comprising a casing having peripheral sides and a bottom, means secured to said casing for securing said casing to the top of an automobile, a support rod secured to one of said sides, rod extensions pivotally attached to said support rod, the longitudinal axis of said extensions extending in the same direction as the axis of said rod, diagonal brace members pivotally attached to other of said sides and detachably secured to said rod extensions, a canvas sheet secured to said support rod and said rod extensions, said sheet being otherwise supported outwardly of said automobile by telescoping posts detachably engaging the free corners of said canvas sheet, said telescoping posts, said rod extensions, and said canvas sheet being adapted to be retained in said casing when said shade is collapsed, said support rod being spaced from said one of said sides inwardly therefrom.

3. An automobile top shade comprising a casing having peripheral sides and a bottom, means secured to said casing for securing said casing to the top of an automobile, a support rod secured to one of said sides, rod extensions pivotally attached to said support rod, the longitudinal axis of said extensions extending in the same direction as the axis of said rod, diagonal brace members pivotally attached to other of said sides and detachably secured to said rod extensions, a canvas sheet secured to said support rod and said extensions, said sheet being otherwise supported outwardly of said automobile by telescoping posts detachably engaging the free corners of said canvas sheet, said telescoping posts, said rod extensions, and said canvas sheet being adapted to be retained in said casing when said shade is collapsed, said support rod being spaced from said one of said sides inwardly therefrom, said means for securing said casing to the top of an automobile including spaced, transverse beams, suction cups depending from said beams and adjustable members secured to said beams, hooks attached to said adjustable members, said hooks being adapted to engage the rain gutters of said automobile.

References Cited in the file of this patent

UNITED STATES PATENTS

| Number | Name | Date |
|---|---|---|
| 2,107,608 | Hewlett | Feb. 8, 1938 |
| 2,585,449 | Eskew | Feb. 12, 1952 |